United States Patent [19]
Stewart et al.

[11] Patent Number: 5,978,972
[45] Date of Patent: *Nov. 9, 1999

[54] HELMET SYSTEM INCLUDING AT LEAST THREE ACCELEROMETERS AND MASS MEMORY AND METHOD FOR RECORDING IN REAL-TIME ORTHOGONAL ACCELERATION DATA OF A HEAD

[75] Inventors: Walter Stewart, Baltimore; Nicholas Jones, Monkton; Wolfger Schneider, Columbia, all of Md.

[73] Assignee: Johns Hopkins University, Baltimore, Md.

[*] Notice: Under 35 U.S.C. 154(b), the term of this patent shall be extended for 00 days.

[21] Appl. No.: 08/872,675

[22] Filed: Jun. 11, 1997

Related U.S. Application Data

[60] Provisional application No. 60/020,271, Jun. 14, 1996.

[51] Int. Cl.$^6$ .................................................. A42B 3/04
[52] U.S. Cl. ........................ 2/422; 2/425; 2/906; 73/491; 340/669
[58] Field of Search ................................ 2/422, 425, 906; 340/669; 455/100; 73/488, 489, 491, 492, 514.01, 514.02, 514.35

[56] References Cited

U.S. PATENT DOCUMENTS

| | | |
|---|---|---|
| Re. 27,532 | 12/1972 | Morris . |
| 2,514,250 | 7/1950 | Meredith . |
| 2,643,869 | 6/1953 | Clark . |
| 3,036,469 | 5/1962 | Di Giovanni . |
| 3,069,573 | 12/1962 | Van Liew . |

(List continued on next page.)

FOREIGN PATENT DOCUMENTS

| | | |
|---|---|---|
| 700591 | 1/1966 | Italy . |
| 46-38389 | 11/1971 | Japan . |
| 612349 | 6/1978 | Russian Federation . |
| 1035523A | 8/1983 | Russian Federation . |
| 2 061 502 | 5/1981 | United Kingdom . |

OTHER PUBLICATIONS

R. Shea et al, "Computing Body Segment Trajectories in the Hybrid III Dummy Using Linear Accelerometer Date", Journal of Biomechanical Engineering, Feb. 1994, vol. 116, pp. 37–43.

D. Cesari et al, "Evaluation of Human Tolerance in Frontal Impacts", Society of Automotive Engineers, Inc. 1979, pp. 875–914.

(List continued on next page.)

*Primary Examiner*—Peter Nerbun
*Attorney, Agent, or Firm*—Pillsbury Madison & Sutro LLP

[57] ABSTRACT

A system designed to measure and record in real time data relating to translational and angular acceleration of an individual's head during normal sporting activity. One embodiment of the device includes at least three orthogonal accelerometers mounted within a sports helmet together with means for recording, in real-time, the data output from the accelerometers. The data is either recorded on a memory card or other mass memory means installed in the helmet, or is transmitted to a nearby receiver for reception and storage on a computer's hard drive or other conventional mass storage device. The device provides real-time storage of translational and angular acceleration data over a length of time such that cumulative exposure effects and thus limits can be established for the individual's further or future participation in the sport. The data also allows detection of the precise motions of the head which precede the occurrence of a severe head injury.

20 Claims, 7 Drawing Sheets

U.S. PATENT DOCUMENTS

| | | |
|---|---|---|
| 3,076,343 | 2/1963 | Dumas et al. . |
| 3,113,463 | 12/1963 | Holt . |
| 3,120,130 | 2/1964 | Cohen . |
| 3,143,891 | 8/1964 | Voutsas . |
| 3,224,245 | 12/1965 | Alibrandi et al. . |
| 3,283,586 | 11/1966 | Davies et al. . |
| 3,498,138 | 3/1970 | Stewart . |
| 3,559,492 | 2/1971 | Erdley . |
| 3,788,647 | 1/1974 | Evans . |
| 3,840,726 | 10/1974 | Harrison . |
| 3,877,313 | 4/1975 | Ferriss . |
| 3,994,020 | 11/1976 | Villari . |
| 4,110,741 | 8/1978 | Hubert et al. . |
| 4,112,323 | 9/1978 | Kawashima . |
| 4,161,874 | 7/1979 | Specker et al. . |
| 4,182,187 | 1/1980 | Hanson . |
| 4,216,402 | 8/1980 | Engdahl . |
| 4,221,986 | 9/1980 | Besson . |
| 4,250,757 | 2/1981 | Hanson . |
| 4,326,303 | 4/1982 | Rappleyea . |
| 4,342,227 | 8/1982 | Petersen et al. . |
| 4,350,918 | 9/1982 | Sato . |
| 4,392,830 | 7/1983 | Salzman et al. . |
| 4,397,185 | 8/1983 | Craig et al. . |
| 4,398,417 | 8/1983 | Shutt . |
| 4,439,706 | 3/1984 | Matsuoka et al. . |
| 4,440,160 | 4/1984 | Fischell et al. . |
| 4,457,173 | 7/1984 | Hunter . |
| 4,461,553 | 7/1984 | Doerr et al. . |
| 4,472,472 | 9/1984 | Schultz . |
| 4,489,609 | 12/1984 | Burdess et al. . |
| 4,502,035 | 2/1985 | Obenauf et al. . |
| 4,520,669 | 6/1985 | Rider . |
| 4,527,982 | 7/1985 | Salzman . |
| 4,534,557 | 8/1985 | Bigelow et al. . |
| 4,560,166 | 12/1985 | Emerson . |
| 4,590,801 | 5/1986 | Merhav . |
| 4,601,205 | 7/1986 | Pittman . |
| 4,644,793 | 2/1987 | Church . |
| 4,649,311 | 3/1987 | Mukohjima et al. . |
| 4,655,081 | 4/1987 | Burdess . |
| 4,663,785 | 5/1987 | Comparetto . |
| 4,665,748 | 5/1987 | Peters . |
| 4,677,397 | 6/1987 | Nakayama et al. . |
| 4,679,434 | 7/1987 | Stewart . |
| 4,691,556 | 9/1987 | Mellander et al. . |
| 4,694,687 | 9/1987 | Bonin et al. . |
| 4,699,006 | 10/1987 | Boxenhorn . |
| 4,732,647 | 3/1988 | Aine . |
| 4,736,629 | 4/1988 | Cole . |
| 4,743,200 | 5/1988 | Welch et al. . |
| 4,744,249 | 5/1988 | Stewart . |
| 4,750,364 | 6/1988 | Kawamura et al. . |
| 4,769,629 | 9/1988 | Tigwell . |
| 4,774,679 | 9/1988 | Carlin . |
| 4,777,965 | 10/1988 | Allison et al. . |
| 4,841,773 | 6/1989 | Stewart . |
| 4,869,509 | 9/1989 | Lee . |
| 4,872,342 | 10/1989 | Hanson et al. . |
| 4,873,867 | 10/1989 | McPherson et al. . |
| 4,893,509 | 1/1990 | MacIver et al. . |
| 4,922,756 | 5/1990 | Henrion . |
| 4,926,689 | 5/1990 | Hanson . |
| 4,930,351 | 6/1990 | Macy et al. . |
| 4,939,935 | 7/1990 | Amand . |
| 4,941,354 | 7/1990 | Russell et al. . |
| 4,996,877 | 3/1991 | Stewart et al. . |
| 5,000,817 | 3/1991 | Aine . |
| 5,007,290 | 4/1991 | Egley et al. . |
| 5,024,089 | 6/1991 | Norling . |
| 5,065,626 | 11/1991 | Hanson . |
| 5,065,627 | 11/1991 | Stewart . |
| 5,090,243 | 2/1992 | Holdren et al. . |
| 5,115,291 | 5/1992 | Stokes . |
| 5,126,813 | 6/1992 | Greiff . |
| 5,144,184 | 9/1992 | Greiff . |
| 5,166,571 | 11/1992 | Konno et al. . |
| 5,179,947 | 1/1993 | Meyerson et al. . |
| 5,195,371 | 3/1993 | Greiff . |
| 5,241,861 | 9/1993 | Hulsing, II . |
| 5,249,465 | 10/1993 | Bennett et al. . |
| 5,253,526 | 10/1993 | Omura et al. . |
| 5,331,854 | 7/1994 | Hulsing, II . |
| 5,341,682 | 8/1994 | Hulsing, II . |
| 5,383,363 | 1/1995 | Kulmaczewski . |
| 5,473,945 | 12/1995 | Grieff et al. . |
| 5,487,305 | 1/1996 | Ristic et al. . |
| 5,490,411 | 2/1996 | Hogan . |
| 5,539,935 | 7/1996 | Rush, III ................................ 2/425 |
| 5,546,609 | 8/1996 | Rush, III ................................ 2/422 X |
| 5,631,427 | 5/1997 | Bridges ................................ 73/491 X |

OTHER PUBLICATIONS

F. A. Pintar et al, "Experimental Production of Head–Neck Injuries Under Dynamic Forces", Head and Neck Injuries in Sports, ASTM STP 1229, American Society for Testing and Materials, Philadelphia, 1994, pp. 203–211.

W. H. Muzzy III et al, "Comparison of Kinematic Parameters Between Hybrid II and Neck System With Human Volunteers for $-G_x$ Acceleration Profiles", Naval Aerospace Medical Research Laboratory Detachment, 20th Stapp Car Crash Conference, pp. 43–74.

D.C. Schneider et al, "Impact Studies of Facial Bones and Skull", (720965) Impact Studies, pp. 186–203.

Alan M. Nahum et al, "Impact Tolerance of the Skull and Face", (680785), Proceedings of Twlfth Stapp Car Crash Conference, pp. 302–316, (Oct. 22–23).

Gerald W. Nyquist et al, "Facial Impact Tolerance and Response", (861896) Thirtieth Stapp Car Crash, pp. 379–400, Oct. 1986.

C. Got et al, "Results of Experimental Head Impacts on Cadavers: The Various Data Obtained and Their Relations to Some Measured Physical Parameters", (780887) pp. 57–99, 1978 Society of Automotive Engineers, Inc.

Channing L. Ewing et al, "Dynamic Response of the Head and Neck of the Living Human to $-G_x$ Impact Acceleration", (680792), Proceedings of Twelfth Stapp Car Crash Conference, pp. 424–439, 1968.

C. L. Ewing et al, "The Effect of the Initial Position of the Head and Neck on the Dynamic Response of the Human Head and Neck to $-G_x$ Impact Acceleration", 20th Stapp Car Crash Conference, pp. 487–512, 1975.

C. L. Ewing et al, "Living Human Dynamic Response to G–II Accelerations Measured on the Head and Neck", (690817) 13th Stapp Car Crash Conference, pp. 400–415, 1969.

C. L. Ewing et al, "Torque Versus Angular Displacement Response to Human Head to $-G_x$ Impact Acceleration", (730976) Response to Human Head.

N. R. Ordway et al, "The Effect of Head Position on the Analysis of Cervical Motion", Head and Neck Injuries in Sports, ASTM STP 1229, Earl F. Hoerner, Ed. American Society for the Testing and Materials, Philadelphia, 1994, pp. 212–220.

L. W. Schneider et al, "Prediction of Head/Neck Dynamic Response of Selected Military Subjects to $-G_x$ Acceleration", Aviation, Space and Environmental Medicine, Jan. 1978, pp. 211–223.

W. H. Zangemeister et al, "Cerebral Potentials Evoked by Fast Head Accelerations", Neurological University Clinic Hamburg, Hamburg, FRG, Neurological Research, Sep. 1990, vol. 12, pp. 137–146.

C. S. Tien et al, "Numerical Advances in Gross–Motion Simulations of Head/Neck Dynamics", Journal of Biomechanical Engineering, May 1987, vol. 109, pp. 163–168.

J. W. Melvin et al, "Angular Acceleration Measurement Techniques for Head Impact", Biomedical Science Dept., General Motors Research Laboratories, Warren, MI, pp. 31–37.

Robert W. Mann et al, "Gait Analysis—Precise, Rapid Automatic, 3–D Position and Orientation Kinematics and Dynamics", Newman Laboratory.

A. J. Padgaonkar et al, Measurement of Angular Acceleration of a Rigid Body Using Linear Accelerometers, Biomechanics Research Center, Transactions of the ASME, Sep. 1975, pp. 552–556.

Y. King Liu, "Measurement of Angular Acceleration of a Rigid Body Using Linear Accelerometers", Journal of Applied Mechanics, Jun. 1976, pp. 377–378.

Werner Goldsmith et al, "Numerical Evaluation of the Three–Dimensional Response of a Human Head–Neck Model to Dynamic Loading", (840861), Dept. of Mechanical Engineering, University of California, Berkeley, pp. 19–95.

A.H.S. Holboum, "Mechanics of Head Injuries", Lewis B. Flinn Library, Delaware Academy of Medicine, Oct. 9, 1943, pp. 438–441.

L. Schmid et al, "Experience With Headgear in Boxing", Sports Medicine, 1968, pp. 171–176.

J. Johnson, "Peak Accelerations of the Head Experienced in Boxing", Medical and Biological Engineering, May 1975, pp. 396–404.

F. Unterhamscheidt, "The Historical and Medical Aspects—Boxing", American Society for Testing and Materials, Philadelphia, 1994, pp. 257–286.

D. F. Meaney et al, "Diffuse Axonal Injury in the Miniature Pig: Biomechanical Development and Injury Threshold", AMD, vol. 169/Med, vol. 25, Crashworthiness and Occupant Protection in Transportation Systems ASME 1993, pp. 169–175.

F. Unterhamscheidt, "30 Plus Years of Head and Neck Injuries—Primate and Human Models' Responses to Energy Load and Forces", American Society for Testing Materials, Philadelphia, 1994, pp. 177–257.

David C. Viano et al, Measurement of Head Dynamics and Facial Contact Forces in the Hybrid III Dummy, General Motors Research Labs. Biomedical.

HELMET SYSTEM INCLUDING AT LEAST THREE ACCELEROMETERS AND MASS MEMORY AND METHOD FOR RECORDING IN REAL-TIME ORTHOGONAL ACCELERATION DATA OF A HEAD

This application claims the benefit of the Provisional Appln. No. 60/020,271 filed Jun. 14, 1996. +gi

GOVERNMENT RIGHTS

The invention described herein was made in the course of work under grant number 5R01NS26450 from the National Institute of Health. The U.S. Government may retain certain rights in this invention.

BACKGROUND

1. Field of the Invention

The present invention relates to real-time recording of the translational and angular acceleration of a head and, in particular a human head and, in a most preferred implementation, the head of a living human subject in normal activity.

More particularly, it relates to a helmet-based system which is typically worn while playing a sport such as boxing or football, and to the method of recording and storing data relating to translational and angular accelerations of the person's head due to impact forces acting thereon.

2. Background of Related Art

Translational movement relates to the motion of a rigid body in such a way that any line which is imagined rigidly attached to the body remains parallel to its original position. Translational acceleration is the time rate of change of the velocity of the translational movement. Angular acceleration (also called rotational acceleration) is shown in FIG. 3. As point p moves on a circular path with radius r through angular displacement $\Theta$, angular velocity is the rate of change of $\Theta$ with respect to time. Angular acceleration $\alpha_2$ is the rate of change of angular velocity. The tangential component of translational motion T shown in FIG. 3 is actually measured. Normal acceleration (which is a form of translational acceleration) relates to the acceleration toward the center of the circular motion.

Little is known about how a living human head accelerates in translational and angular directions in response to forces, and even less about the correspondence between specific forces and injury, particularly with respect to injuries caused by repeated exposure to impact forces of a lower level. Almost all of what is known is derived from animal studies, studies of cadavers under specific directional and predictable forces (i.e. a head-on collision test), and from crash a dummies or other simplistic mechanical models. The conventional simplistic application of known forces and/or measurement of forces applied to animals, cadavers, and crash dummies limit our knowledge of a relationship between forces applied to a living human head and resultant injury thereto.

Some conventional devices have employed modeled testing approaches which do not relate to devices which can be worn by living human beings.

When studying impact with dummies, they are typically secured to sleds with a known acceleration and impact velocity. The dummy head then impacts with a target, and the peak accelerations experienced by the head are recorded. Impact studies using cadavers are performed for determining the impact forces and pressures which cause skull fractures.

For instance, U.S. Pat. No. 4,873,867 to McPherson et al. and U.S. Pat. No. 4,691,556 to Mellander et al. disclose the use of accelerometers mounted within cavities formed in the head of a crash dummy. Viano et al. "Measurement of Head Dynamics and Facial Contact Forces in the Hybrid III Dummy" and Shea et al. "Computing Body Segment Trajectories in the Hybrid III Dummy Using Linear Accelerometer Data" disclose the placement of between seven and nine accelerometers inside a cavity formed in the head of a dummy. Pintar et al. "Experimental Production of Head-Neck Injuries Under Dynamic Forces" discloses removal of the top of a cadavers head and placement of accelerometers therein. Got et al. "Results of Experimental Head Impacts On Cadavers: The Various Data Obtained and Their Relations to Some Measured Physical Parameters" disclose the use of high speed photography and three accelerometers screwed into different positions in a cadavers skull, depending on the impact test to be performed. Nahum et al. "Impact Tolerance of the Skull and Face" disclose testing of a human skull using a single uniaxial accelerometer placed opposite a predetermined point of impact.

Other conventional devices have measured the acceleration of a living human head, but these devices have measured a specific, usually single axis of acceleration which was known beforehand with a single accelerometer placed accordingly, and/or relate to devices which are not worn in everyday practice of sports. Moreover, because these devices measure the limits of living human response to predetermined forces and the results thereof, they require many factors of safety.

For instance, Schmid et al. "From the Practice, Experience With Headgear in Boxing" discloses the use of a transistor apparatus with crystal gauges and a loop-oscillograph to measure skull accelerations. Two crystal gauges were fastened to the head by bandages, one on the occipital bone and the other on the temporal bone.

The device measured a predetermined force from a predetermined direction. Johnson et al. "Peak Accelerations of the Head Experienced in Boxing" discloses the use of one piezoelectric accelerometer held on by a scuba diving helmet. Muzzy III, et al. "Comparison of Kinematic Parameters Between Hybrid II Head and Neck System with Human Volunteers for -$G_x$ Acceleration Profiles" discloses the use of six accelerometers held within a subject's mouth. Similarly, U.S. Pat. No. 4,461,553 to Doerr et al. discloses the use of accelerometers in a mouthpiece. Ewing et al. "Dynamic Response of the Head and Neck of the Living Human to -$G_x$ Impact Acceleration" discloses a cumbersome, view-blocking device wherein a biaxial accelerometer is held in the mouth, and another is strapped over the bregma, and these are measured together with a photo-technique to determine accelerations. This device measured forces from a predetermined single direction of force. The use of a rate gyroscope held in the mouth of the subject is disclosed by Ewing et al. "Living Human Dynamic Response to -$G_x$ Impact Acceleration II—Accelerations Measured on the Head and Neck", and Ewing et al. "Torque versus Angular Displacement Response of Human Head to -$G_x$ Impact Acceleration".

Some conventional devices have required cumbersome and complex circuitry which is hardwired between the sensors and the computing device. These devices are impractical for use in actual sporting events.

For instance, Ordway et al. "The Effect of Head Position on the Analysis of Cervical Motion" discloses electromagnetic sensors attached to the top of the head with a velcro strap. In this device, a fixing vest was worn by the subject to exclude flexion and extension of the thoracic spine from the measurements, and the digitizing system was hardwired to a personal computer for data collection. U.S. Pat. No. 3,788,647 to Evans discloses the temporary use of a swing measurement system for analyzing test swings of an athlete's arm, bat or club for fitting of orthopedic devices.

Models are less desirable than measurement of a living human head during performance of the actual sport because of the uniqueness of the human anatomy and thus the limited extent to which the living human head can be modeled adequately with mechanical models or even cadavers. Moreover, modeling alone does not provide data as to the cause of an injury experienced by a specific individual. Non-living heads (i.e. cadavers) do not account for the application of muscle tension in the neck nor for muscular or pain reactions of the head. For instance, modeling the forces impacting on a persons head does not provide specific data as to an injury suffered by a particular individual, i.e., data derived from models and cadavers does not provide the means to correspond actual human injuries to the specific accelerations which may have caused the injury.

Helmets are conventional devices. It has been known to conduct drop tests of helmets using an accelerometer placed opposite the predetermined site of impact. For instance, see the drop tests performed on football helmets disclosed by U.S. Pat. No. 4,326,303 to Rappleyea, and U.S. Pat. No. 3,994,020 to Villari. However, these tests are most often destructive tests and do not provide data for a specific person while wearing the helmet for its intended use, e.g., during a football game. Moreover, these tests specifically tested helmets themselves (not the resultant force to the head), and measured thresholds for which the helmets would crack or break, not the head.

There are other devices that have been developed to measure head motions for a variety of other applications. These include: (1) In military applications, systems have been developed to monitor the orientation of a pilot's head to assist in targeting. (2) In virtual reality systems, the motion of the head and other extremities is continuously monitored to provide feedback to the computer enabling updating of images, etc. But these applications are for helmets which are extensively instrumented, must remain hardwired to the support infrastructure, typically use only one or two position detectors, and do not measure and record forceful blows to the head.

For instance, U.S. Pat. No. 4,743,200 to Welch et al. discloses a fiber optic helmet used for control of a display system. However, this system not only requires complex circuitry and a permanent fiber optic connection to large pieces of equipment, it is not used during performance of a sport, and the accelerometer is used to determine only the position of the head, not to determine translational and angular acceleration due to undetermined external forces.

U.S. Pat. No. 4,769,629 to Tigwell discloses the use of a two-position mercury switch in a motorcycle helmet to light a stop light when decelerating in the forward direction only.

Placement of a motion sensor on the head has been known.

For instance, U.S. Pat. No. 4,440,160 to Fischell et al. discloses the use of a single accelerometer in a headband for detecting whether or not the head is accelerating beyond a threshold amount. U.S. Pat. No. 4,869,509 to Lee, U.S. Pat. No. 4,502,035 to Obenauf et al., and U.S. Pat. No. 4,560,166 to Emerson all disclose a motion sensor mounted on a golfer's cap to sense improper head movement during a golf swing. However, long term exposure to continual forces can be as injurious to a head as can be a single hard blow. Conventional devices do not measure and record translational and angular forces to a living human head over a period of time of exposure, particularly where the exposure is of a low level below that which would normally cause concern for injury. For instance, continual blows to a head during a boxing match or football game may not cause injury individually but in combination may prove lethal. Head injury in these sports can have significant short and long term consequences which can be made more severe if blows to the head continue (e.g., from continued play in the same game or in a subsequent game). Thus, conventional devices which measure acceleration in a single direction, or from a single event, or only above a predetermined threshold, or in a way which does not permit use during performance of the actual sport do not provide the dynamics necessary to correlate exposure to forces to the injury caused by that exposure over a period of time.

Injuries are not the only area of study which are deficient. In sports such as boxing where the bout is scored with the number of punches of a certain force connecting to the head, scoring is made difficult by conventional observational techniques of scoring.

SUMMARY OF THE INVENTION

The Head Acceleration-monitoring Technology (HAT) is a portable system designed to measure and record acceleration data in real time in both translational and angular directions of an individual's head during normal activity. While developed specifically for the head, monitoring of other body parts, or the body in general is envisioned.

HAT offers the opportunity to study head acceleration, human tolerance limits, the range and direction of accelerations in humans in relation to morphological features (e.g., neck circumference, head volume, neck length), and the relationship between precise measures of head acceleration in translational and angular directions and acute consequence to brain physiology and function. Moreover, it provides the ability to measure an individual's cumulative exposure to translational and angular accelerations while allowing unaffected performance of everyday sports and activities.

The HAT is designed as a standard component of otherwise conventional sporting gear, in particular the helmet. It includes at least three orthogonally-placed accelerometers and means to record the output therefrom in real time. As many as three sets of three orthogonally-placed accelerometers can be used to measure uniquely the translational, angular and normal components of acceleration of the head. In one embodiment, three orthogonally-placed accelerometers are sufficient to provide some translational and angular acceleration information regarding the head by integration. The translational, angular and normal components of acceleration become more detailed (and thus separable) by the use of more accelerometers. At most, nine accelerometers are placed in the helmet so as to define all angular and translational accelerations of the head.

The data from the accelerometers are recorded in real time during performance of the sport. The data is either recorded on a memory card or other mass memory means installed in the helmet, or is transmitted to a nearby receiver for storage on a computer's hard drive or other conventional mass storage device. The HAT provides real-time storage of data over a length of time such that cumulative exposure effects and thus limits can be established for further or future participation in the sport by the individual wearing the helmet equipped with the present invention. The data also allows detection of the precise motions of the head which precede the occurrence of a severe head injury. For this purpose HAT could be modified to record in real-time detailed data only when the accelerations exceed a defined threshold. The data is recorded in real-time, but may be processed in either real-time as the data is recorded, or at a later time so as to integrate and otherwise determine the translational, angular and normal components of acceleration of the sportsperson's head.

The present invention is applicable for use with other parts of the body. For instance, other applications could include the study of the acceleration of body parts in relation to each other (e.g., among pole vaulters, high jumpers, or gymnasts), or to understand factors affecting acceleration in sprinters and swimmers (e.g., starting and turns). Because of its portability, small size, and convenient light-weight, HAT can also be used to study the acceleration of the body parts of live animals. For example, the acceleration and deceleration of birds in flight could be studied with a modified version of HAT.

BRIEF DESCRIPTION OF THE DRAWINGS

The present invention will be understood better with reference to the drawings, in which.

DESCRIPTION OF PRESENTLY PREFERRED EMBODIMENTS

Figure 1:
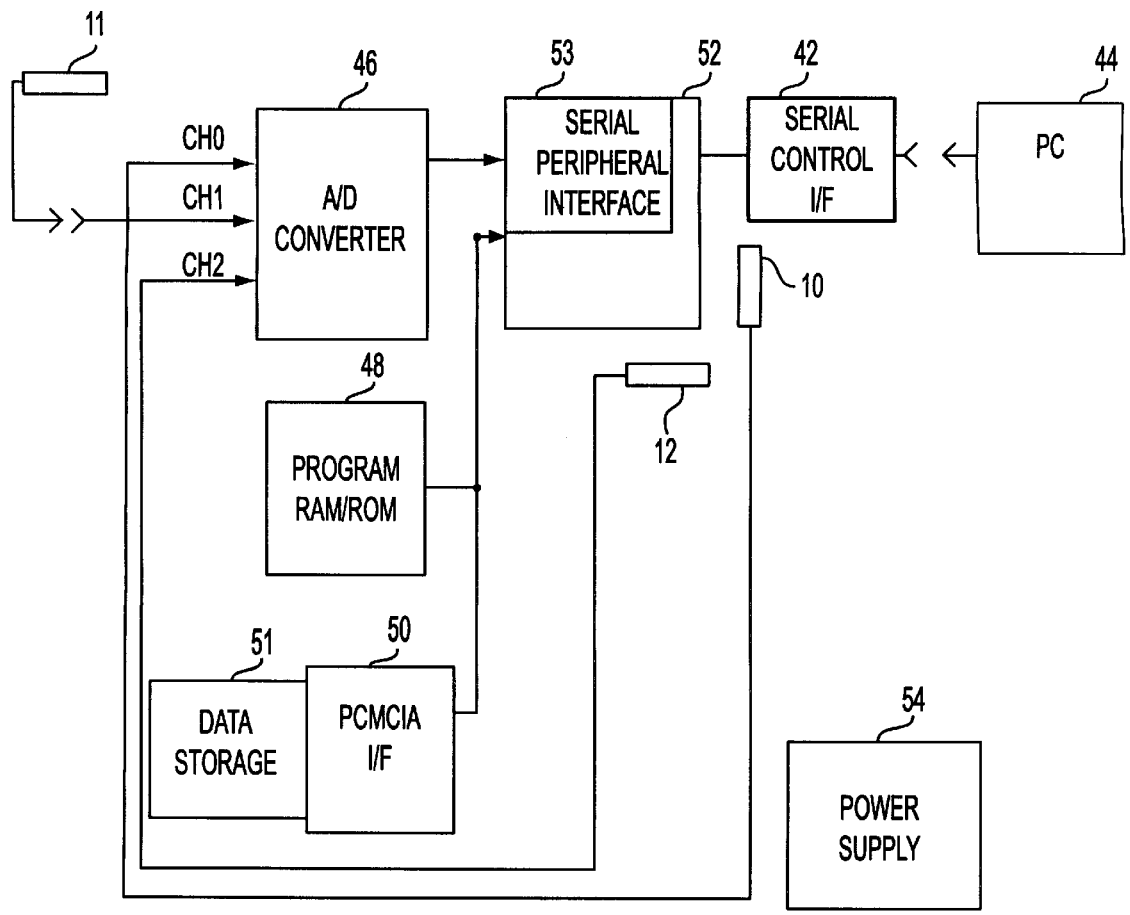
FIG. 1 is a block diagram of the first embodiment of the present invention.

FIG. 1 shows a general block diagram of the electronic portion of a first embodiment of the present invention installed inside a sports helmet. A processor 52 controls data sampling and storage operations with respect to data from an A/D Converter 46 for storage in a Personal Computer Memory Control Interface Adapter (PCMCIA) card installed in a PCMCIA Interface 50. The device further includes program RAM and ROM 48, and a Serial Control Interface 42.

Figure 2A:
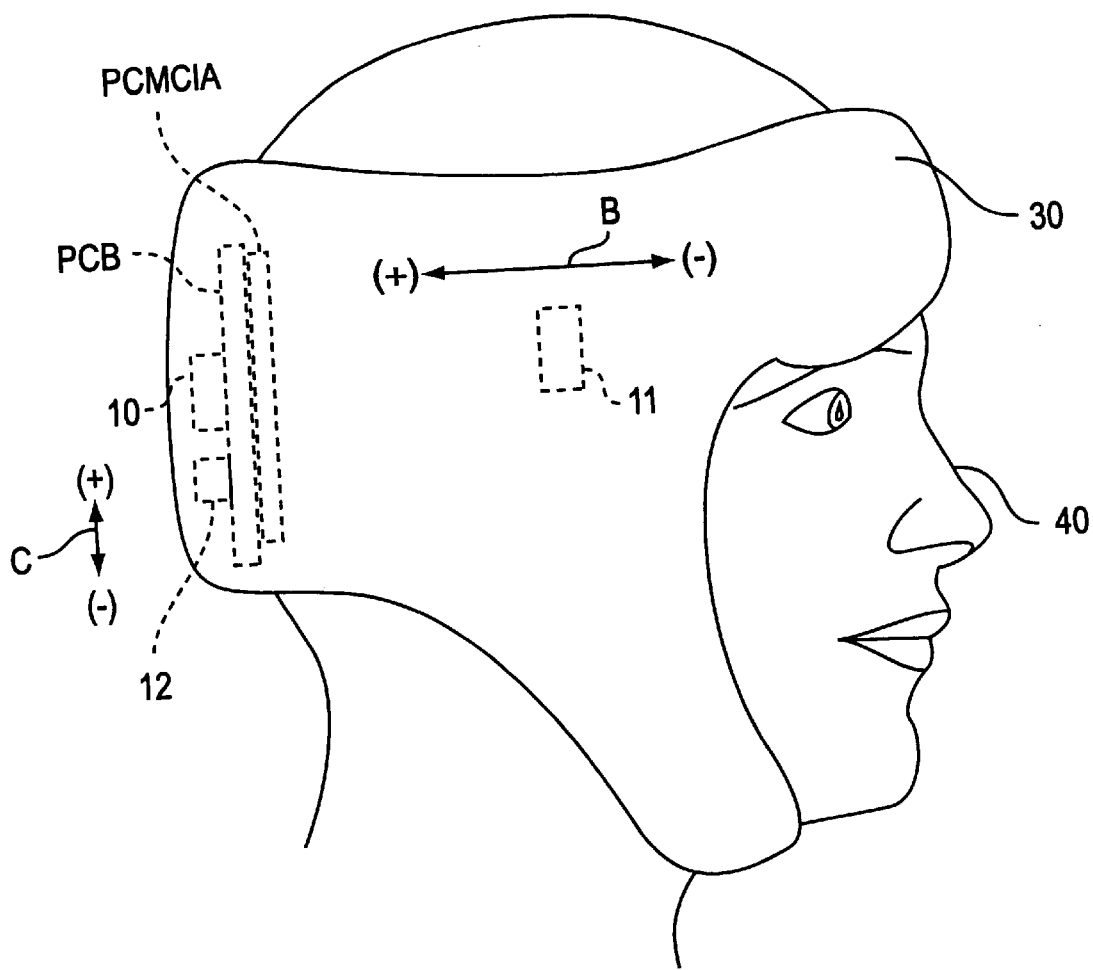
FIG. 2(a) is a right side view of a first embodiment of the present invention using three orthogonal accelerometers and a memory card installed inside a boxing helmet.
Figure 2B:
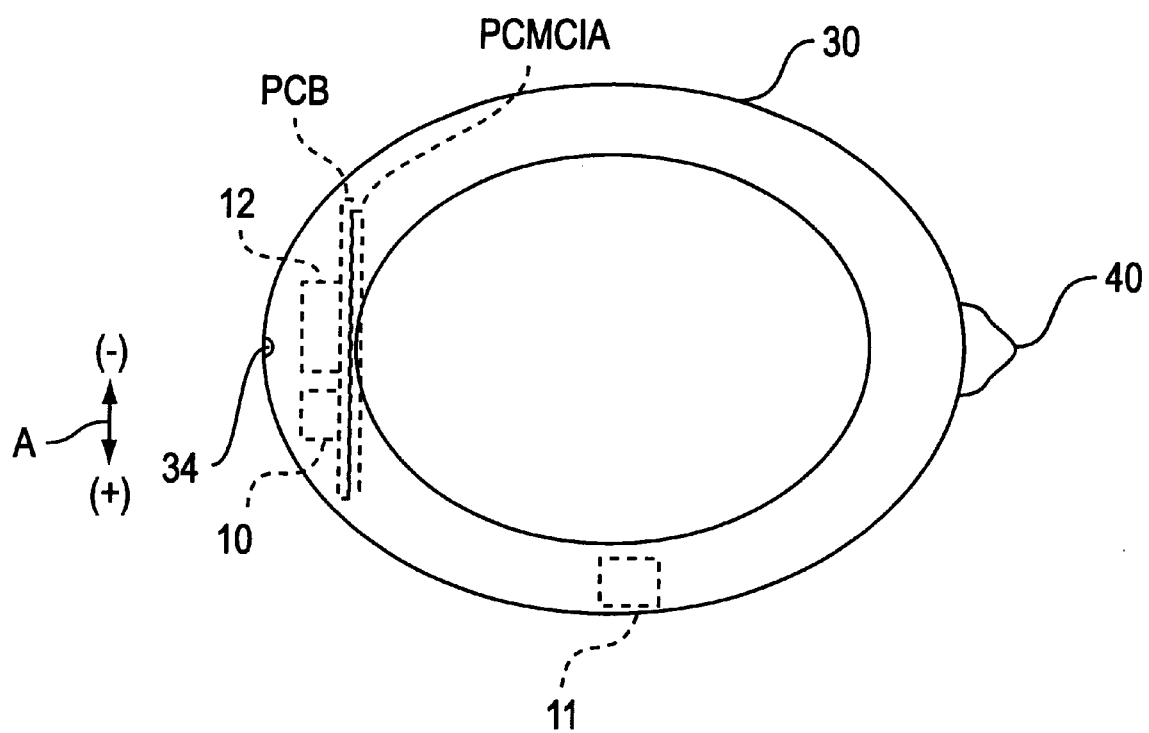
FIG. 2(b) is a top view of the first embodiment of the present invention.
Figure 3:
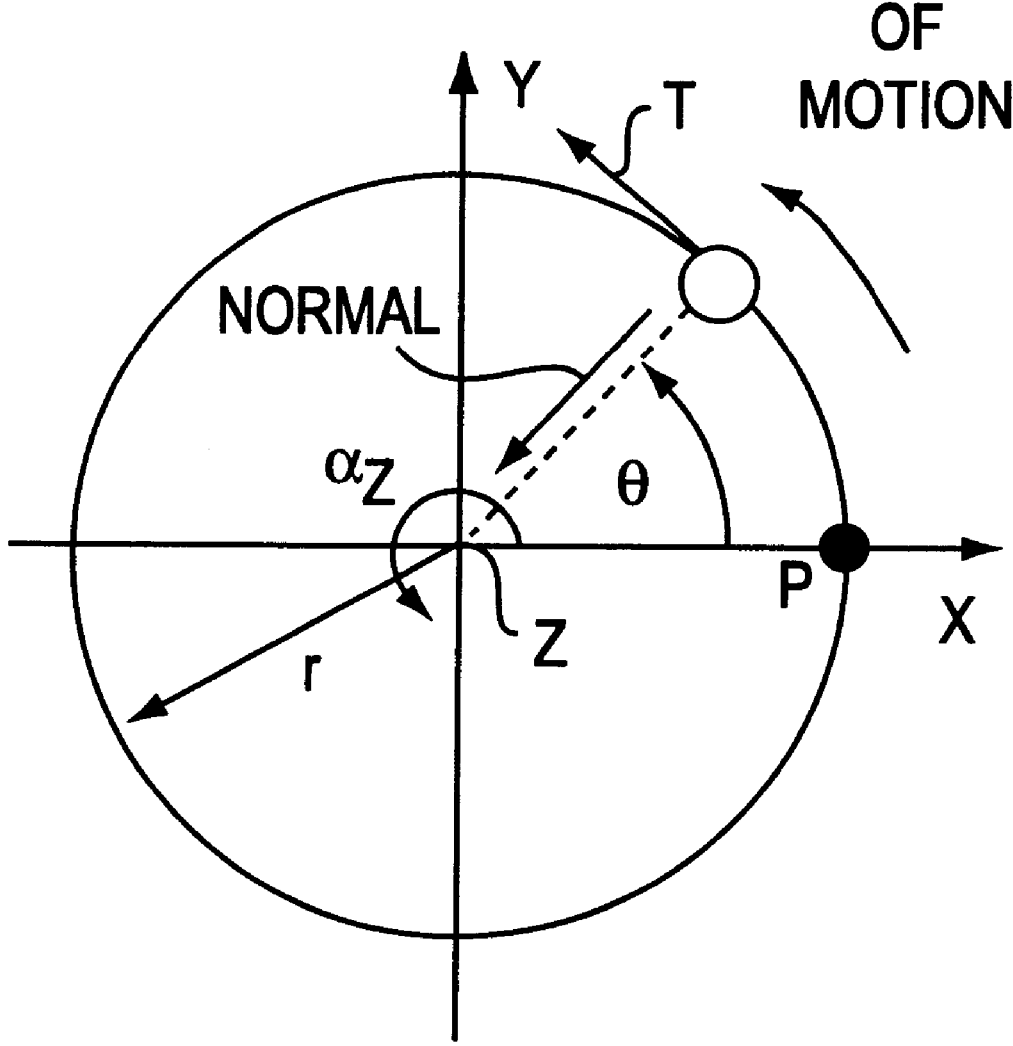
FIG. 3 is a diagram showing angular (rotational) velocity about a z axis and normal acceleration.

FIGS. 2(a) and 2(b) show the first embodiment of the present invention installed in an otherwise conventional boxing helmet while being worn by a boxer. FIG. 2(a) is a right side view, while FIG. 2(b) is a top view showing the nose 40 of the boxer.

The specific type helmet 30 is any which is conventionally used in the sport for which the invention is being applied. For instance, in this embodiment, the helmet 30 is a boxing helmet. Other helmets which the present invention is applicable to, but in no way is limited to, are football helmets, lacrosse helmets, hockey helmets, bicycle helmets, and motorcycle helmets. The helmet might also be one worn by epileptics or other patients in need of protection from injury to the head.

An important goal in the design of the HAT was that the translational, angular and normal accelerations experienced by the head be captured accurately and sufficiently through optimal location of at least three accelerometers 10–12. It is found that a minimum of three orthogonal accelerometers 10–12 are sufficient to provide data which corresponds directly to motion of the head in three dimensional space such that a correspondence between translational and rotational acceleration of the head and any resultant injury can be determined on a mass population who practice the respective sport (e.g. boxing, football, bicycling, etc.).

It was also important that the electronic components used in the HAT be small enough to be contained inside the helmet without significant change to the structure and function of the conventional helmet. In this way, the HAT is comfortable enough for the sports person to wear in the relevant everyday sports activity without hindering, inhibiting, or otherwise affecting the ability of the user to perform the sport.

In the first embodiment of the present invention, three accelerometers 10–12 are installed orthogonal to one another inside a boxing helmet 30. Although three accelerometers 10–12 are considered to be minimum, as many as nine accelerometers can be used so as to uniquely resolve measurement of the translational, angular and normal components of acceleration of the head.

The three accelerometers 10–12 are capable of providing point estimates of head acceleration at the location of the accelerometers 10–12. However, theoretically, six accelerometers provide more detailed data sufficient to resolve the head motions into three translational and three rotational accelerations about the center of mass of the head. The maximum number of nine accelerometers would provide the ability to separate the tangential and normal components of acceleration.

The three orthogonal accelerometers 10–12 of the present embodiment provide aggregated data relating to three translational directions and two angular accelerations, but not sufficient information to separate translational and rotational components uniquely. Of course, any two translational accelerations and associated angular acceleration can be measured by the use of three suitably located and oriented accelerometers as disclosed by the present invention. The more accelerometers that are implemented, the more detailed the information provided will be, and the opportunity provided to resolve (with suitable location and orientation) each of the various components of acceleration.

It is believed that the up-and-down motion of the head is very limited because of the lack of elasticity of the head/neck in the vertical direction, and in fact practically negligible in most instances and thus of less importance to correlation with resultant injury. Thus, ignoring this direction of motion, eight accelerometers is the practical maximum number required by the present invention to sufficiently determine the specific values of each of the remaining translational, angular and normal components of acceleration of the head.

The proper orientation and placement of the accelerometers 10–12 with respect to the head are important because the positioning of the accelerometers 10–12 influences the data that is collected. In this embodiment, three single axis accelerometers 10–12 are oriented such that the respective axes of sensitivity are parallel to each of three orthogonal axes A to C, as shown in FIGS. 2(a) and 2(b). In this embodiment, the accelerometers 10–12 are off-center with respect to the center of mass of the head, and thus the outputs of each of the accelerometers 10–12 will include responses to more than one component of acceleration.

For ease of manufacture, two accelerometers 10, 12 are mounted at right angles on a printed circuit board (PCB), together with the processor 52, the A/D converter 46, the Program RAM/ROM 48, the PCMCIA interface 50, and the serial control interface 42. The third accelerometer 11 is mounted orthogonal to the two accelerometers 10, 12 inside the right side of the helmet 30. Of course, the third accelerometer 11 may just as effectively be mounted on the left side of the helmet 30, or, with proper mounting, on the PCB with accelerometers 10–12. It is possible, with proper mounting, to mount eight (or even nine) accelerometers on the PCB.

The particular accelerometers used with this embodiment are linear accelerometers purchased from Entran Devices Inc., Model No. EGA-125-250D, although any small accelerometers might be used. It is also possible that rotational accelerometers be used in addition to, in combination with, or in place of the linear accelerometers. Thus, either translational or rotational accelerometers can be used.

Moreover, the smaller and lighter the accelerometers, the better. For instance, piezoelectric accelerometers and/or silicon accelerometers are preferred because of their low power consumption and small size. Multi-axis accelerometers might also be used. Accelerometers which perform on-board calculation of velocity and displacement might also be used to track events and permit additional kinematic and kinetic analyses to be performed. Ideally, it is preferred that the accelerometers consume as little power as possible, so as to reduce the size of the power supply 54.

The three accelerometers 10–12 are called channels 0–2, respectively. In FIGS. 2(a) and 2(b), the positive and negative signs associated with the directions of sensitivity A to C of accelerometers 10–12, respectively, represent the direction, not acceleration and deceleration.

Channel 0 is mounted to the PCB and captures accelerations from a side-to-side motion, lateral flexion; to the right of the boxer is positive while to the left is negative as shown by arrow A in FIG. 2(b). Channel 1 is sewn in the helmet above the boxer's right ear and records acceleration in a fore-to-aft motion, anterior-posterior flexion; backwards is positive and forwards is negative, as shown in FIG. 2(a).

Channel 0 and Channel 1 not only measure translational accelerations, but also the tangential acceleration associated with the rotational acceleration component about the vertical axis, the z axis. If Channel 2 were positioned opposite Channel 1 it would have been possible to determine the three components of acceleration associated with Channel 0 and Channel 1; however, it was decided in this embodiment that it was more important that the HAT monitor the overall motion of the head. Therefore, Channel 2 was also mounted to the PCB and captures accelerations parallel to the z axis; up is positive and down is negative, as shown in FIG. 2(a).

A certified boxing helmet made by Tuf-Wear was used to house the helmet-mounted components of the HAT. The back of the helmet 30 had a piece of half inch thick foam padding encased in leather and attached to the helmet by laces. The back padding was removed and replaced by a leather pouch. The pouch was created from new leather and constructed so that there was a Velcro opening at the top. The pouch was large enough to hold some padding and the helmet-mounted components of the HAT. The pouch provides access to the HAT during data collection and transfer, while the Velcro provided a strong fastener to prevent the pouch from opening and the HAT from dislodging during data collection.

A small amount of the padding conventionally provided on the back of the boxing helmet is removed through the rear seam 34 so as to make room for the PCB, which is approximately 1.5"×2.0"×0.5" in overall dimension. The main constraint on the size of the HAT is dictated by the length and width of the PCMCIA memory card.

The HAT can be reduced significantly in size by utilizing a transmitter and receiver pair, and locating the data storage 51 remote to the helmet-mounted components of the system. The transmitter is installed inside the helmet 30 in place of (or in) the PCMCIA Interface 50. The receiver and data storage 51 are located at a computer remote from the helmet 30.

The rear of the helmet was chosen because it is less likely to be impacted directly by an external force, and thus the HAT was less likely to be damaged in that location. Moreover, the safety margin of the head was not significantly impacted by the reduction of padding in the rear. Of course, it is envisioned that the accelerometers could be placed in the front, top or sides of a helmet.

The third accelerometer was sewn in the seam that runs perpendicular to the ground above the ear hole and between two foam pads. The wires were then sewn into the top seam of the helmet and allowed to continue back to the pouch where they were connected with the PCB.

The battery 54 is mounted to the PCB with a clip, although the battery 54 may be mounted anywhere inside the helmet 30 and preferably toward the back.

The output of the first accelerometer 10 is input to channel 0 of the A/D converter 46, the output of the second accelerometer 11 is input to channel 1, and the output of the third accelerometer 12 is input to channel 2. If more than three accelerometers are used, then the appropriate number of additional channels and/or A/D converters are implemented. The particular A/D converter used in this embodiment was the MAX188, which is an 8-channel, 12-bit, integrated circuit marketed by MAXIM Inc. The MAX188 includes an integral sample/hold feature. Although an integral sample/hold is preferred, it may instead be external to the A/D converter.

It is of course possible and envisioned that accelerometers with digital outputs may be used. Some digital accelerometers currently available output pulses at a varying frequency, depending upon the acceleration. Such serial output can be fed to counters for sampling by the processor 52.

The processor 52 controls the storage of data from the A/D Converter 46 to the data storage 51. The processor 52 comprises any conventional processor device, including a microcontroller or a microprocessor, and controls the operation of the HAT system. In this embodiment, the particular processor 52 implemented is a Model 68HC11 manufactured by Motorola. The processor 52 is operated by a program using the FORTH computer language and controls the storage of the 12-bit binary data from the A/D Converter 46 in its raw form in the data storage 51. Each of the 12-bit binary data from the A/D converter 46 is stored in two bytes of the data storage 51, although the data may of course be stored in any order or any form. For instance, if an 8-bit A/D converter is used, the data may be stored in a single byte. Moreover, it is possible to implement storage of two samples of the 12-bit data in three bytes of memory storage.

In the present embodiment, each round of boxing required 1.08 Mbyte of the data storage 51, based on the equation:

$$\begin{aligned}&180 \text{ seconds} * 3 \text{ channels} \\ &* 1000 \text{ samples/sec} * 2 \text{ bytes/sample} \\ &= 1.08 \text{ Mbyte.}\end{aligned}$$

Data compression techniques can be implemented to reduce the memory capacity requirements. In the case of data compression, the stored data may include compression/decompression codes. This would enable more than 2 Mbyte of data to be stored on a 2 Mbyte PCMCIA card plugged into the PCMCIA Interface 50. Another simple form of data compression is to store data only during the periods for which major translational, angular and/or normal accelerations of the head are expected. In the present embodiment, this is during the three minutes of each round of boxing.

Other forms of data compression include representing long periods of time with no significant acceleration activity with one or two byte markers which relate to the length of time of no or low activity, instead of storing the raw data which is essentially a sequence of "zeroes" in this instance.

In FIG. 1, the analog-to-digital A/D converter 46 is connected to the data bus of the processor 52 through a serial peripheral interface 53. Of course, A/D converters having a parallel data output could share the data bus with the RAM/ROM 48 and PCMCIA Interface 50. Either an integral or externally implemented serial port for the processor 52 may be used.

Although the A/D converter 46 of the presently preferred embodiment is 12 bits wide, it is also envisioned that larger (e.g., 16) or smaller (e.g., 8 bit) A/D converters could be used. Of course, the larger the A/D converter data word is, the larger the amount of data that will need to be stored, and thus the larger the required capacity of the data storage 51.

Program random-access memory and read-only memory (RAM/ROM) 48 is provided for storage and operation of the software program which the processor 52 runs. The size of the ROM and RAM need only be sufficient to satisfy the needs of the operating software of the processor 52. The program RAM/ROM can be internal to the processor 52, such as in the case of a microcontroller, or external to the processor 52 as in the case of a microprocessor. The random access memory of the RAM/ROM 48 can be volatile memory (e.g. static random access memory (SRAM) or dynamic random access memory (DRAM)) or non-volatile memory (e.g., flash memory or electrically erasable programmable read only memory (EEPROM)).

The data from each of channels 0 to 2 is stored on the 2 Mbyte PCMCIA memory card, temporarily plugged into the PCMCIA Interface 50 and serving as the data storage 51. The HAT is installed in the rear of the helmet 30 such that the PCMCIA interface is easily accessible external to the user without removing the helmet. This enables comfortable recordation of the outputs of the accelerometers 10–12 (e.g., at a one kilohertz sampling rate) for each three-minute round of boxing, and fast removal and replacement of the PCMCIA card in the minute between rounds of is boxing.

It is possible to replace the PCMCIA Interface 50 with a wireless transmission device which transmits the data from the A/D Converter 46 for reception and storage on a mass storage device of a computer equipped with a matching receiver and the remote mass storage device. The PCMCIA card used with this embodiment has a capacity of 2 Mbyte, although clearly, higher capacity memory cards are envisioned and would likely be preferable for storing data over longer periods of time. The PCMCIA plugs into the PCMCIA Interface 50 so that it can be periodically swapped with a fresh PCMCIA card while the data is retrieved from the full PCMCIA card, so as to provide seamless storage of real-time data over longer periods of time.

Using this technique, two PCMCIA cards are sufficient to record three three-minute rounds of boxing for later analysis, although recording of more rounds is possible with data compression techniques and/or higher capacity PCMCIA cards. If the cards are replaced with fresh PCMCIA cards between rounds, an endless number of rounds can be recorded. For instance, it is possible that while one PCMCIA card is installed in the HAT and recording data, the other can be dumping the data stored therein in a PC-based read-out system. Moreover, if a transmitter is installed in the helmet 30 rather than (or in addition to) the PCMCIA memory card, the data can be stored for an indefinite period of time.

The exact voltage and capacity of the power supply 54 is in large part a function of the power requirements of the processor 52 and other components on the PCB. Although many conventional power supplies are possible, the power supply 54 for the boxing helmet of the present embodiment is a simple 9-volt battery which is held on the PCB with a snap-in holder. The battery may instead be mounted separately in the helmet and internally wired to the PCB. Other types of power sources, including solar cells, can be used as determined by the particular application.

The HAT samples the outputs of the accelerometers 10–12 at approximately 1,000 samples per second for each three minute round of boxing, although if the memory capacity of the data storage 51 and the particular accelerometers used allow, a faster data sampling rate is also possible. Although it is possible that the data be sampled at a rate slower than 1,000 samples per second, a sampling rate of at least 1,000 samples per second is preferred so as to allow sufficiently detailed information to be recorded.

The Entran accelerometers, model EGA-125-250D, have a range of 250 G's and limit the practical sampling rate to about 1,000 to 2,000 Hz. Studies of boxers have shown accelerations to frequently be in range of 20 G's, with many punches being between 50 and 100 G's, while predictions were made that some boxers may deliver punches resulting in head accelerations as high as 260 G's. The prediction of peak forces of 260 G's exceeds slightly the range of the Entran accelerometers, but from the data collected in the field testing, this was not considered a problem in recording most accelerations, or for correlating the outputs of the accelerometers 10–12 with motions of the head. The HAT device is easily capable of measuring blows in excess of 80 to 100 G's in less than 0.1 second, but has a useful range of up to 250 G's with Entran accelerometers. Of course, other accelerometers can be chosen to provide a higher range.

In operation, in the case of the boxing helmet of the present embodiment, it is preferable to record data continuously during each three minute round of boxing to ensure that the HAT captures data relating to translational, angular and normal accelerations of the head in actual boxing conditions. By capturing real-time data over the entire round of boxing, the data can be correlated and analyzed directly, e.g., along with a videotape of the boxing match so as to establish visually the motion of the head causing certain responses of the accelerometers 10–12. This is a particularly useful analysis tool for use in the initial correlation of dangerous motions of the head with resultant injuries when using less than nine accelerometers because the exact accelerations of the head in all possible translational and angular directions cannot be determined with data from only three accelerometers.

Because of the limited capacity of the PCMCIA memory card plugged into the PCMCIA interface 50, the length of time that the HAT can store data is limited when using one or a number of PCMCIA cards. However, the present invention can be modified easily to allow longer and even indefinite uses of the HAT device. For instance, the data storage 51 shown in FIG. 1 can be located remotely from the helmet, with a wireless communication medium between the processor 52 of the HAT and a remote computer connected to the data storage 51. For redundancy, it is also possible that both local data storage 51 be implemented in the helmet 30 and remote mass storage be additionally provided. In such a case, the local data storage 51 might record only the most recent exposure of the head (e.g., the last 30 minutes), while the remote mass storage might be sufficiently large to provide a permanent record of the history of the accelerations experienced by the person wearing the HAT. The PCMCIA memory card in this instance would be analogous to the flight data recorder of a commercial airplane which records the last 30 minutes of flight.

Storage of data from the outputs of the accelerometers 10–12 is started and stopped by the processor 52 via commands transmitted through the serial control interface 42. In the present embodiment, a PC 44 is connected via a removable serial RS-232 cable to the serial control interface 42 and passes commands to the processor 52. Although RS-232 is the standard interface used in this embodiment, any conventional communications link is possible, including a wireless communications link (e.g., radio frequency, optical, etc.), to control the processor 52. It is also possible that the user may instruct the processor 52 via push-button commands or other means local to the HAT. The link between the PC 44 and the processor 52 may alternatively be a parallel link.

In the boxing embodiment, the PC 44 was connected to the processor 52 via the serial link before each round of boxing to start the sampling of the data at approximately the time that the round of boxing starts. The command set may include commands which pause data storage during break periods. The external serial connection is removed before the boxing begins.

The operating software of the processor 52 monitors the serial control interface 42 for the presence of commands. These commands set the general parameters of the data storage operation of the HAT. Although the serial control interface 42 of this embodiment is an RS-232 interface, any suitable communications means, wired or wireless, may be implemented so as to provide commands to the processor 52 from an external source. Of course, the commands may alternatively or additionally be entered locally, such as through a keypad mounted on the helmet, an electronic key, or other means to establish certain general parameters regarding the sampling of the accelerometers, e.g., when to start, the sampling rate, and when to stop.

The commands are transmitted through an RS-232 port of the PC 44, which is temporarily connected to the HAT through the serial control interface 42. The serial connection between the serial control interface 42 and the PC 44 is removed for normal operation of the HAT. The serial control interface 42 can also be used to upload and/or transmit the sampled data.

Some commands as implemented in the present embodiment are as follows, although clearly other commands or methods could be used as well to program general parameters for the processor 52. These commands are communicated over the RS-232 serial link between the PC 44 and the processor 52 using conventional communications software such as PROCOMM. Using this program, all commands as indicated in quotations are executed with the ENTER key and should be entered in the following order.

"INIT": initiates the program for three channels of data at a 1 ms sampling frequency.

"NULL_FILE": sets the file data.bin in the PCMCIA card to have all zeroes, and sets the program to overwrite the file when collecting data. This is an optional command which is used as a check to ensure that the HAT is recording data.

"1 SET_MS": sets the sample time to 1 ms. (Note that other sampling rates greater or less than 1 ms sampling can be implemented.)

"NULLGS": sets the 0 G reading to zero for all channels, given the orientation of the HAT at the time of executing this command.

"VIEW_ACCS": displays continuously the accelerations of all channels in deciGs given a particular orientation or motion of the HAT. This is an optional command.

To program HAT to record multiple rounds of data in this embodiment, the following commands are used:

"n R_INTERVAL C!": sets the number of minutes n between each round of data being collected. Typically, the interval is set to 1.

"R_INTERVAL C@.": shows the number of minutes set for the time interval between rounds. This is an optional command.

"n #OF_ROUNDS C!": sets the number of rounds n to be used for data collection. n is typically set to 3 for an amateur boxing match.

"#OF_ROUNDS C@.": shows the number of rounds set to be collected. This is an optional command.

"GO": prompts the user for the present time and start time for data collection.

HAT can be programmed to record any time duration within the limits of the capacity of the data storage 51 (e.g., data for only one round of boxing).

"180000. GO": gets 180,000 samples (three minutes of data at 1 Khz sampling rate) from each channel after prompted for present time and start time for data collection.

"10,000 GO": collects 10,000 samples of data for 10 seconds at 1 Khz sampling rate. If multiple rounds of data are to be collected, this command will be ignored.

"1194. 10000. D+ 20 TDUMP": dumps 20 samples from three channels starting at the 10,000th sample. The 1194. gets the beginning of the DOS file in the PCMCIA card. This is an optional command.

Before use, the PCMCIA memory card is formatted using a DATAI/O ISA bus plug-in peripheral card in a personal computer and formatted with conventional utility software previously provided by DATAI/O. Once formatted, a null file is copied to the formatted PCMCIA memory card. The processor 52 controls storage of the data in the PCMCIA memory card such that the file parameters in the PCMCIA memory card are not changed.

In operation, when the PCMCIA memory card is filled with sampled data, or after sampling is otherwise complete, the PCMCIA card is removed from the helmet and is inserted into the PCMCIA interface of a conventional laptop computer. Many methods of copying the data from the PCMCIA card are possible. The present embodiment accomplished this task by configuring the PCMCIA interface of the laptop using a conventional utility package to appear as an additional hard drive. This enables a standard MSDOS copy command to be used to copy the data stored in the PCMCIA memory card as a file to the hard drive of the Digital 386 laptop computer for further processing. Using this method, it is necessary for the PCMCIA card to be in the slot of the laptop computer during boot up of the laptop.

The MSDOS command used to copy the file (the PCMCIA card is configured to include the data as a file named "data.bin") from the d: drive to the c: drive of the laptop computer is "copy d:data.bin c:data2.bin".

Once all the data was collected, the data files were copied to Digital Alpha workstations in the Department of Civil Engineering at The Johns Hopkins University, and a FORTRAN program converted the binary format into an ASCII format for observation.

The real-time data captured during an actual boxing match can be correlated with a videotape of the same so as to provide an additional tool for correlating specific head motion and any resultant injury. This is particularly useful when using less than nine accelerometers, wherein the translational, angular, and normal components of the acceleration of the head cannot be resolved uniquely based on the stored data alone. This is because three accelerometers are not enough to resolve uniquely all translational, angular, and normal accelerations of the head.

Figure 4A:
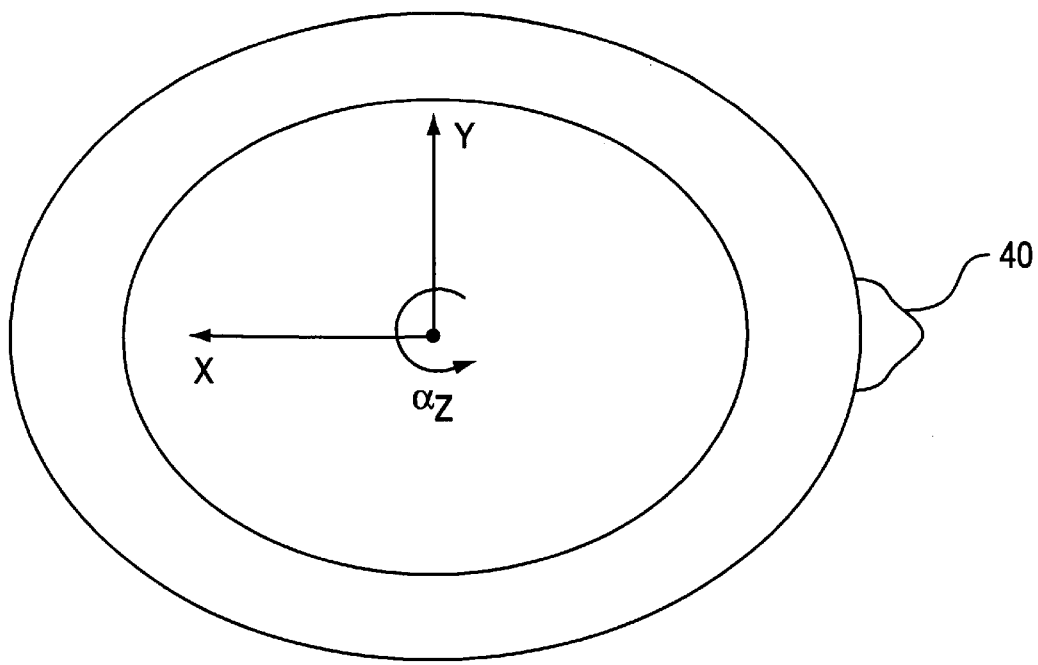
FIG. 4(a) is a schematic top view of the present invention showing the x axis, y axis, and rotational acceleration $\alpha_z$ about the center of mass of the head.
Figure 4B:
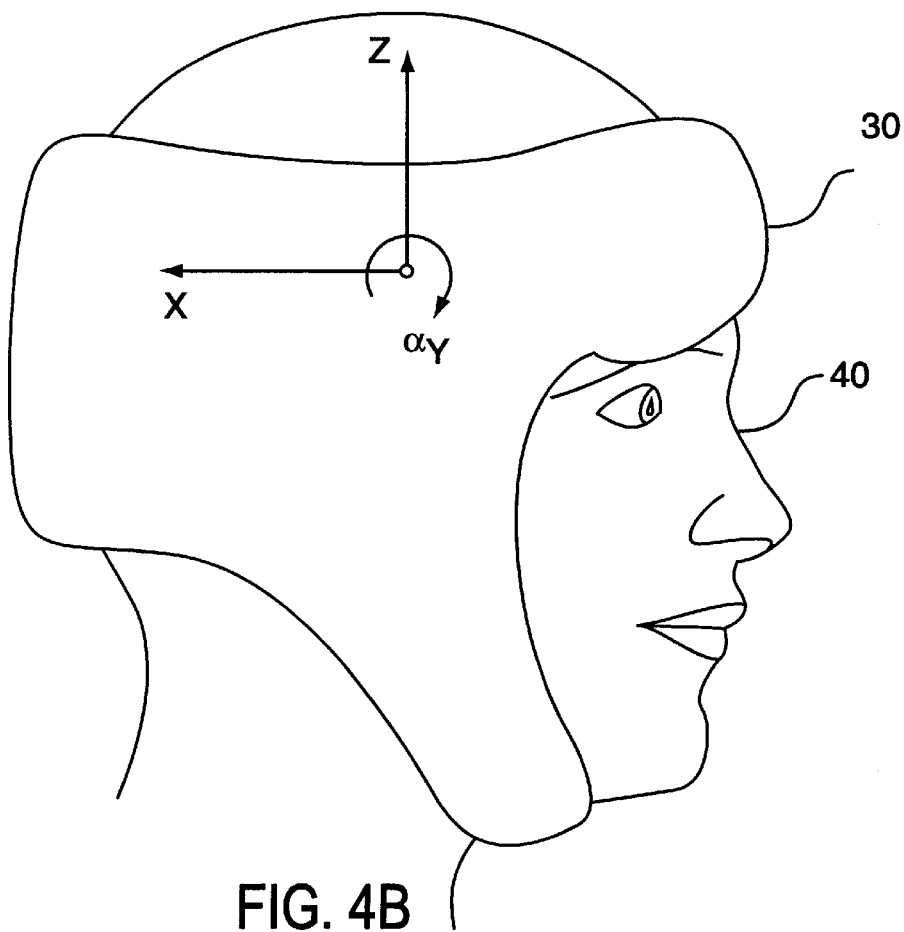
FIG. 4(b) is a right side view of the present invention showing the x axis, z axis, and rotational acceleration $\alpha_y$ about the center of mass of the head.
Figure 4C:
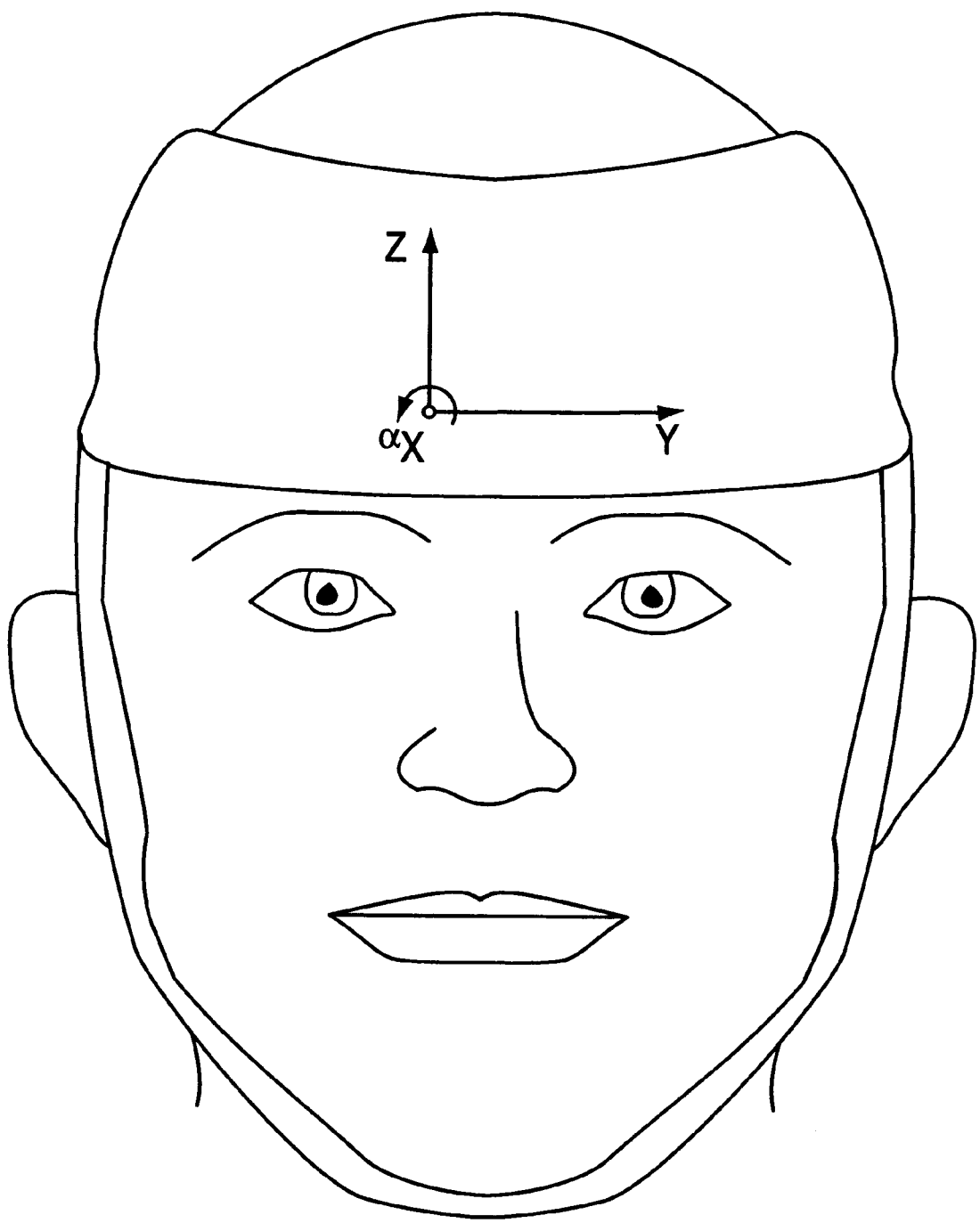
FIG. 4(c) is a front view of the present invention showing the y axis, z axis, and rotational acceleration $\alpha_x$ about the center of mass of the head.

FIGS. 4(a) to 4(c) show the directions of translational accelerations in the x, y and z directions, and angular accelerations $\alpha_x$, $\alpha_y$, $\alpha_z$ about the x, y and z axes, of a head from its center of mass.

The X and Y directions shown in FIGS. 4(a) to 4(c) appear to be the most important from an injurious standpoint, with the Z axis appearing not to be as important. Of the rotational axes $\alpha_x$, $\alpha_y$, $\alpha_z$ shown, the most important rotational axis appears to be $\alpha_2$, although $\alpha_x$ and $\alpha_y$ are also important parameters. The $\alpha_z$ axis is important because it tends to relate importantly to injuries resulting from a tear of the brain stem from the top of the spinal cord.

If fewer than nine accelerometers are used, accelerations which are not measured directly can be integrated or estimated. It is not absolutely necessary that the accelerations be uniquely determined to establish a correlation between certain data patterns and resultant injury.

Figure 5:
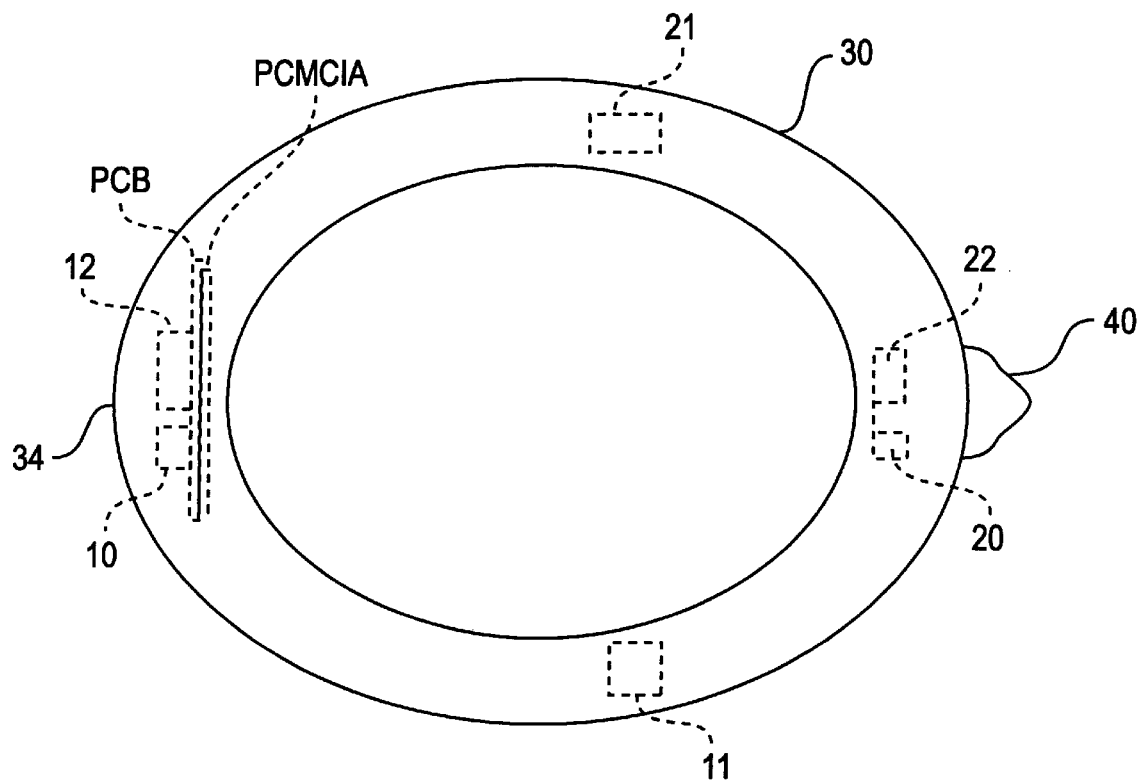
FIG. 5 shows a top view of a second embodiment of the present invention using three pairs (six total) of parallel accelerometers in a sporting helmet.

FIG. 5 shows another embodiment of the present invention wherein six (i.e. three parallel pairs) of accelerometers 10 and 20, 11 and 21, 12 and 22, are included in a helmet. The six accelerometers 10–12, 20–22 form two sets of three orthogonal accelerometers. Ideally, the mated accelerometer pairs (i.e., 10 and 20, 11 and 21, 12 and 22) are ideally opposite one another through the center of mass of the head, to minimize the integration necessary to estimate the accelerations experienced by the center of mass of the head. In this embodiment, one or many PCMCIA memory cards or other mass storage means can be used to increase the length of time between data dumps. Of course, a transmitter/receiver pair can be included to remote the mass storage from the helmet 30.

The placement of accelerometers in a boxing helmet is sensitive because of the exposure of the front area to punches. However, the placement is less sensitive in non-contact sports such as bicycling or motorcycling, or where the helmet is substantially rigid such as in football.

The present invention can also be utilized in scoring, refereeing or otherwise assist in the actual sporting event. For instance, in boxing, it is possible to correlate certain responses of the accelerometers 10–12 with desirable punches exceeding a predetermined threshold, and thus be processed and scored at a ringside receiver. It might also be possible to determine if a football player is improperly using his helmet (e.g., illegal spearing). Of course, in these embodiments, the PCMCIA card would be replaced by a transmitter/receiver pair with data storage being provided by any suitable mass storage device remote from the helmet.

Although the invention has been described in detail with reference to its presently preferred embodiments, it will be understood by those of ordinary skill in the art that various modifications can be made without departing from the spirit and scope of the invention.

What is claimed is:

1. An acceleration-monitoring device comprising:

a system unit disposed proximate to a body part of an individual at a first location, said system unit constructed and arranged to remain substantially fixed relative to said body part while said individual engages in physical activity, wherein said system unit includes a first accelerometer disposed along a first acceleration-monitoring direction, and a second accelerometer disposed along a second acceleration-monitoring direction, said first and second acceleration-monitoring directions being substantially orthogonal to each other;

a third accelerometer disposed proximate to said body part of said individual at a second location displaced a distance from said first location, said third accelerometer constructed and arranged to remain substantially fixed relative to said body part while said individual engages in physical activity, said third accelerometer being disposed along a third acceleration-monitoring direction which is substantially orthogonal to a plane defined by said first and second acceleration-monitoring directions; and a power supply attached to said individual constructed and arranged to remain attached while said individual engages in physical activity, said power supply being electrically attached to said system unit and said third accelerometer to supply electrical power, wherein said acceleration-monitoring device is free from protruding wires and free from attachments which would tend to impede or alter physical activity of said individual, and at least one of said accelerometers provides an output signal corresponding to a range of accelerations of said body part.

2. An acceleration-monitoring device according to claim 1, wherein said system unit includes a processor which is in communication with said first, second and third accelerometers, and a memory region including a random access memory in communication with said processor such that said processor can store and retrieve data from said memory region and can read computer program instructions from said memory region.

3. An acceleration-monitoring device, comprising:

a system unit disposed proximate to a body part of an individual at a first location, said system unit constructed and arranged to remain substantially fixed relative to said body part white said individual engages in physical activity, wherein said system unit includes
    a first accelerometer disposed along a first acceleration-monitoring direction, and
    a second accelerometer disposed along a second acceleration-monitoring direction,
    said first and second acceleration-monitoring directions being substantially orthogonal to each other;
a third accelerometer disposed proximate to said body part of said individual at a second location displaced a distance from said first location, said third accelerometer constructed and arranged to remain substantially fixed relative to said body part while said individual engages in physical activity, said third accelerometer being disposed along a third acceleration-monitoring direction which is substantially orthogonal to a plane defined by said first and second acceleration-monitoring directions; and
a power supply attached to said individual constructed and arranged to remain attached while said individual engages in physical activity, said power supply being electrically attached to said system unit and said third accelerometer to supply electrical power,
wherein said acceleration-monitoring device is free from protruding wires and free from attachments which would tend to impede or alter physical activity of said individual,
wherein said system unit includes
    a processor which is in communication with said first, second and third accelerometers, and
    a memory region including a random access memory in communication with said processor such that said processor can store and retrieve data from said memory region and can read computer program instructions from said memory region, and
wherein said system unit includes one of a memory card or mass memory.

4. An acceleration-monitoring device according to claim 2, wherein said system unit includes a transmitter constructed and arranged to transmit a data output signal from said system unit.

5. An acceleration-monitoring device according to claim 4, further comprising a data receiving and storage unit which includes a receiver constructed and arranged to receive said data output signal from said transmitter and a storage device constructed and arranged to store data received by said receiver.

6. An acceleration-monitoring device according to claim 2, wherein said first, second and third accelerometers produce analog output signals and said system unit includes an analog-to-digital converter at an intermediate communication link between said first, second and third accelerometers to convert said analog output signals to digital signals which are processed by said processor.

7. An acceleration-monitoring device according to claim 3, further comprising a memory card swappably attached to said system unit, said memory card being in communication with said system unit to receive data output signals from said system unit and to store said data output signals from said system unit for later retrieval.

8. An acceleration-monitoring device according to claim 2, wherein said first, second and third accelerometers are linear accelerometers that detect accelerations along said first, second and third acceleration-monitoring directions, respectively.

9. An acceleration-monitoring device, comprising:
a system unit disposed proximate to a body part of an individual at a first location, said system unit constructed and arranged to remain substantially fixed relative to said body part while said individual engages in physical activity, wherein said system unit includes
    a first accelerometer disposed along a first acceleration-monitoring direction, and
    a second accelerometer disposed along a second acceleration-monitoring direction,
    said first and second acceleration-monitoring directions being substantially orthogonal to each other;
a third accelerometer disposed proximate to said body part of said individual at a second location displaced a distance from said first location, said third accelerometer constructed and arranged to remain substantially fixed relative to said body part while said individual engages in physical activity, said third accelerometer being disposed along a third acceleration-monitoring direction which is substantially orthogonal to a plane defined by said first and second acceleration-monitoring directions;
a fourth accelerometer disposed proximate to said body part of said individual at a third location displaced a distance from said first and second locations, said fourth accelerometer constructed and arranged to remain substantially fixed relative to said body part while said individual engages in physical activity, said fourth accelerometer being a rotational acceleration-type accelerometer disposed along a fourth acceleration-monitoring direction to detect rotational accelerations within a plane orthogonal to said fourth acceleration direction;
a fifth accelerometer disposed proximate to said body part of said individual at a fourth location displaced a distance from said first and second locations, said fifth accelerometer constructed and arranged to remain substantially fixed relative to said body part while said individual engages in physical activity, said fifth accelerometer being a rotational acceleration-type accelerometer disposed along a fifth acceleration-monitoring direction which is substantially orthogonal to said fourth acceleration-monitoring direction to detect rotational accelerations within a plane orthogonal to said fifth acceleration direction; and
a sixth accelerometer disposed proximate to said body part of said individual at a fifth location displaced a distance from said first, second and third locations, said sixth accelerometer constructed and arranged to remain substantially fixed relative to said body part while said individual engages in physical activity, said sixth accelerometer being a rotational acceleration-type accelerometer disposed along a sixth acceleration-monitoring direction which is substantially orthogonal to a plane defined by said fourth and fifth acceleration-monitoring directions to detect rotational accelerations within a plane orthogonal to said sixth acceleration direction,
a power supply attached to said individual constructed and arranged to remain attached while said individual engages in physical activity, said power supply being electrically attached to said system unit and said third accelerometer to supply electrical power,
wherein said acceleration-monitoring device is free from protruding wires and free from attachments which would tend to impede or alter physical activity of said individual, wherein said system unit includes
a processor which is in communication with said first, second and third accelerometers, and
a memory region including a random access memory in communication with said processor such that said processor can store and retrieve data from said memory region and can read computer program instructions from said memory region, and
wherein said first, second and third accelerometers are linear accelerometers that detect accelerations along said first, second and third acceleration-monitoring directions, respectively.

10. An acceleration-monitoring device according to claim 1, wherein said power supply includes a battery which is electrically attached to said system unit and said third accelerometer to supply electrical power to said system unit and said third accelerometer.

11. A head acceleration-monitoring technology helmet comprising:
a helmet that defines a pouch in a back portion of said helmet constructed and arranged to hold a system unit during data collection periods;
an acceleration-monitoring technology device disposed substantially within said helmet such that said acceleration-monitoring device monitors accelerations of an individual's head during physical activity,
wherein said acceleration-monitoring technology device includes
a system unit disposed substantially within said pouch, said system unit including
a first accelerometer disposed along a first acceleration-monitoring direction, and
a second accelerometer disposed along a second acceleration-monitoring direction,
said first and second acceleration-monitoring directions being substantially orthogonal to each other,
a processor which is in communication with said first and second accelerometers, and
a memory region including at least a random access memory in communication with said processor such that said processor can store and retrieve data from said memory region and can read computer program instructions from said memory region,
a third accelerometer disposed proximate to an ear piece portion of said helmet, said third accelerometer being disposed along a third acceleration-monitoring direction which is substantially orthogonal to a plane defined by said first and second acceleration-monitoring directions and is disposed so that it is in communication with said processor, and
a power supply attached to said individual, said power supply constructed and arranged to remain attached while said individual engages in physical activity, said power supply being electrically connected to said system unit and said third accelerometer to supply electrical power,
wherein said head acceleration-monitoring technology helmet is free from protruding wires and free from attachments which would tend to impede or alter physical activity of said individual, and
at least one of said accelerometers provides an output signal corresponding to a range of accelerations of said body part.

12. A head acceleration-monitoring technology helmet, comprising:
a helmet that defines a pouch in a back portion of said helmet constructed and arranged to hold a system unit during data collection periods;
an acceleration-monitoring technology device disposed substantially within said helmet such that said acceleration-monitoring device monitors accelerations of an individual's head during physical activity,
wherein said acceleration-monitoring technology device includes
a system unit disposed substantially within said pouch, said system unit including
a first accelerometer disposed along a first acceleration-monitoring direction, and
a second accelerometer disposed along a second acceleration-monitoring direction,
said first and second acceleration-monitoring directions being substantially orthogonal to each other,
a processor which is in communication with said first and second accelerometers, and
a memory region including at least a random access memory in communication with said processor such that said processor can store and retrieve data from said memory region and can read computer program instructions from said memory region,
a third accelerometer disposed proximate to an ear piece portion of sad helmet, said third accelerometer being disposed along a third acceleration-monitoring direction which is substantially orthogonal to a plane defined by said first and second acceleration-monitoring directions and is disposed so that it is in communication with said processor; and
a power supply attached to said individual, said power supply constructed and arranged to remain attached while said individual engages in physical activity, said power supply being electrically connected to said system unit and said third accelerometer to supply electrical power,
wherein said head acceleration-monitoring technology helmet is free from protruding wires and free from attachments which would tend to impede or alter physical activity of said individual,
wherein said system unit includes a memory card interface adapted to receive a periodically swappable memory card,
said acceleration-monitoring technology device includes a memory card swappably attached to said system unit, and
said pouch is a resealable pouch constructed and arranged to hold said system unit and said memory card during data collection periods and to permit removal of said memory card between data collection periods so as to permit retrieval of data.

13. A head acceleration-monitoring technology helmet according to claim 12, wherein said first, second and third accelerometers produce analog output signals and said system unit includes an analog-to-digital converter at an intermediate communication link between said first, second and third accelerometers to convert said analog output signals to digital signals which are processed by said processor.

14. A head acceleration-monitoring technology helmet according to claim 13, wherein said first, second and third accelerometers are linear accelerometers that detect accelerations along said first, second and third acceleration-monitoring directions, respectively.

15. A head acceleration-monitoring technology helmet according to claim 14, further comprising
- a fourth accelerometer disposed proximate to a forehead portion of said head acceleration-monitoring technology helmet, said fourth accelerometer being a rotational acceleration-type accelerometer disposed along a fourth acceleration-monitoring direction to detect rotational accelerations within a plane orthogonal to said fourth acceleration direction;
- a fifth accelerometer disposed proximate to a forehead portion of said head acceleration-monitoring technology helmet, said fifth accelerometer being a rotational acceleration-type accelerometer disposed along a fifth acceleration-monitoring direction which is substantially orthogonal to said fourth acceleration-monitoring direction to detect rotational accelerations within a plane orthogonal to said fifth acceleration direction; and
- a sixth accelerometer disposed proximate to an ear portion of said head acceleration-monitoring technology helmet opposed to said first mentioned ear portion, said sixth accelerometer being a rotational acceleration-type accelerometer disposed along a sixth acceleration-monitoring direction which is substantially orthogonal to a plane defined by said fourth and fifth acceleration-monitoring directions to detect rotational accelerations within a plane orthogonal to said sixth acceleration direction.

16. A head acceleration-monitoring technology helmet according to claim 15, wherein said power supply includes a battery in electrical contact with said system unit and said first, second, third, fourth, fifth and sixth accelerometers to supply electrical power.

17. A real-time acceleration-monitoring method comprising:
- attaching an acceleration-monitoring technology device to an individual such that it remains substantially fixed relative to a body part of said individual during physical activity;
- measuring real-time accelerations of said body part of said individual during physical activity along at least a first, a second and a third acceleration measurement direction, wherein said first acceleration measurement direction is substantially orthogonal to said second acceleration measurement direction, and said third acceleration measurement direction is substantially orthogonal to a plane defined by said first and second measurement directions;
- storing said real-time accelerations of said body part of said individual during said physical activity in a mass storage device; and
- retrieving said real-time acceleration data of said body part of said individual during said physical activity,
- wherein said measuring real-time accelerations of said body part of said individual includes measuring a plurality of accelerations corresponding to a range of accelerations in at least one of said acceleration measurement directions.

18. A real-time acceleration-monitoring method according to claim 17, wherein said storing said real-time accelerations of a body part of an individual during said physical activity includes setting a threshold acceleration value such that only real-time acceleration data which exceed said threshold are stored.

19. A real-time acceleration-monitoring method comprising:
- attaching an acceleration-monitoring technology device to an individual such that it remains substantially fixed relative to a body part of said individual during physical activity;
- measuring real-time accelerations of said body part of said individual during physical activity along at least a first, a second and a third acceleration measurement direction, wherein said first acceleration measurement direction is substantially orthogonal to said second acceleration measurement direction and said third acceleration measurement direction is substantially orthogonal to a plane defined by said first and second measurement directions;
- storing said real-time accelerations of said body part of said individual during said physical activity in a mass storage device;
- retrieving said real-time acceleration data of said bode part of said individual during said physical activity;
- filming said individual during said storing real-time accelerations; and
- correlating data obtained from said retrieving said stored acceleration data with a film produced by said filming said individual during said storing said real-time accelerations.

20. A real-time acceleration-monitoring method according to claim 18, further comprising the steps of:
- filming said individual during said step of storing real-time accelerations; and
- correlating data obtained from said step of retrieving said stored acceleration data with a film produced by said step of filming said individual during said step of storing said real-time accelerations.

* * * * *